United States Patent [19]
Kubo

[11] Patent Number: 5,409,641
[45] Date of Patent: Apr. 25, 1995

[54] OPTICAL DISK MANUFACTURING METHOD

[75] Inventor: Toyihide Kubo, Tokushima, Japan

[73] Assignee: Awa Engineering Co., Ltd., Tokushima, Japan

[21] Appl. No.: 80,821

[22] Filed: Jun. 24, 1993

[30] Foreign Application Priority Data

Jun. 30, 1992 [JP] Japan .................................. 4-197693

[51] Int. Cl.⁶ ............................................. B29D 11/00
[52] U.S. Cl. .................. 264/1.33; 264/107; 264/248; 264/320; 264/2.7; 425/810
[58] Field of Search ................... 264/1.3, 1.7, 23, 248, 264/249, 106, 107, 320, 1.33, 2.7; 425/810

[56] References Cited

U.S. PATENT DOCUMENTS

| 3,276,941 | 10/1966 | Burns | 264/248 |
| 4,302,411 | 11/1981 | Nakagawa et al. | 264/107 |
| 4,315,723 | 2/1982 | Antoine et al. | 425/810 |
| 4,452,748 | 6/1984 | Lange et al. | 264/107 |
| 4,659,407 | 4/1987 | Lacotte et al. | 264/107 |
| 4,795,511 | 1/1989 | Wouters et al. | 264/23 |

FOREIGN PATENT DOCUMENTS

| 070514 | 1/1983 | European Pat. Off. | 264/106 |
| 247673 | 12/1987 | European Pat. Off. | 264/1.3 |
| 57-191023 | 11/1982 | Japan | 264/1.7 |

Primary Examiner—Mathieu D. Vargot
Attorney, Agent, or Firm—Wenderoth, Lind & Ponack

[57] ABSTRACT

In the optical disk manufacturing method a clamping plate is placed in the cavity of a disk body and the disk body is heated and compressed to connect the clamping plate to the disk body. Prior to connecting the clamping plate, a groove is established around the perimeter of the clamping plate. A disk body with or without a groove has its target surface compressed by a heat press while a region outside the target surface perimeter is pressed by an upper pressure surface to connect the clamping plate without creating a protrusion from the upper surface of the disk.

15 Claims, 17 Drawing Sheets

OPTICAL DISK MANUFACTURING METHOD

BACKGROUND OF THE INVENTION

This invention relates to an optical disk manufacturing method, and more particularly to a method of connecting a clamping plate to the center of a disk body. In this patent application, the term optical disk is used in the broader context to include optical-magnetic disks.

The optical disk has a clamping plate fixed at its center. The clamping plate allows rotation of the disk, and a sheet metal stamped into a disk shape is used as the clamping plate. The clamping plate is connected to the body of the disk at its center. In the case of a mini-disk (MD), the clamping plate is not fixed to the body of the disk, but is joined to it in a fashion allowing some play.

FIG. 1 and FIG. 2 show a prior art method of joining a clamping plate to the body of a disk. FIG. 1 shows the clamping plate 2 set in position in a cavity 1A provided at the center of the disk body 1. FIG. 2 shows the clamping plate 2 joined to the disk body 1 by compression around the perimeter of the cavity 1A with a heat press 5. This method of connecting the clamping plate has the feature that the clamping plate can be efficiently connected to the disk without the use of adhesive bond or an adhesive tape.

However as shown in FIG. 2, connecting the clamping plate by this method has the drawback that a protrusion 6 is created outside the perimeter compressed by the heat press 5. The protrusion 6 projects above the plane of the surface of the disk body 1 and has a detrimental effect on the operation of an optical disk drive. For example, when a drive head, which is extremely close to the surface of the disk, moves over this region it may be damaged by contact with the protrusion. Further, since the protrusion is not uniform around the entire perimeter but rather has regions with different heights, aerodynamic drag is increased adding a significant load to the driving motor. Ideally, the surface of an optical disk joined with a clamping plate should be planar with no protrusions.

This invention was developed to achieve this goal, and it is thus a primary object of the present invention to provide an optical disk manufacturing method that can join the clamping plate and prevent creation of a protrusion out of the plane of the disk surface.

The above and further objects and features of the invention will more fully be apparent from the following detailed description and the accompanying drawings.

SUMMARY OF THE INVENTION

The optical disk manufacturing method of this invention comprises aligning a clamping plate in a cavity at the center of a plastic disk body, heating and compressing a target surface of the disk body located around the perimeter of the clamping plate with a heat press, and joining the clamping plate to the disk body by distortion of the plastic disk body. The surface of the disk body that is the target surface for compression by the heat press or the region around the outside perimeter of that target surface is prepared with a groove, and the target surface of the disk body provided with this groove is compressed to join the clamping plate to the disk body. The formation of a protrusion around the perimeter of the target surface is prevented on a disk body with or without a groove by compression around the outer perimeter of the target surface by an upper pressure surface at the same time the clamping plate is joined to the disk body by compression around the perimeter of the clamping plate and the disk cavity by the pressure surface of the heat press.

DETAILED DESCRIPTION OF THE INVENTION

First Embodiment

Figure 1:
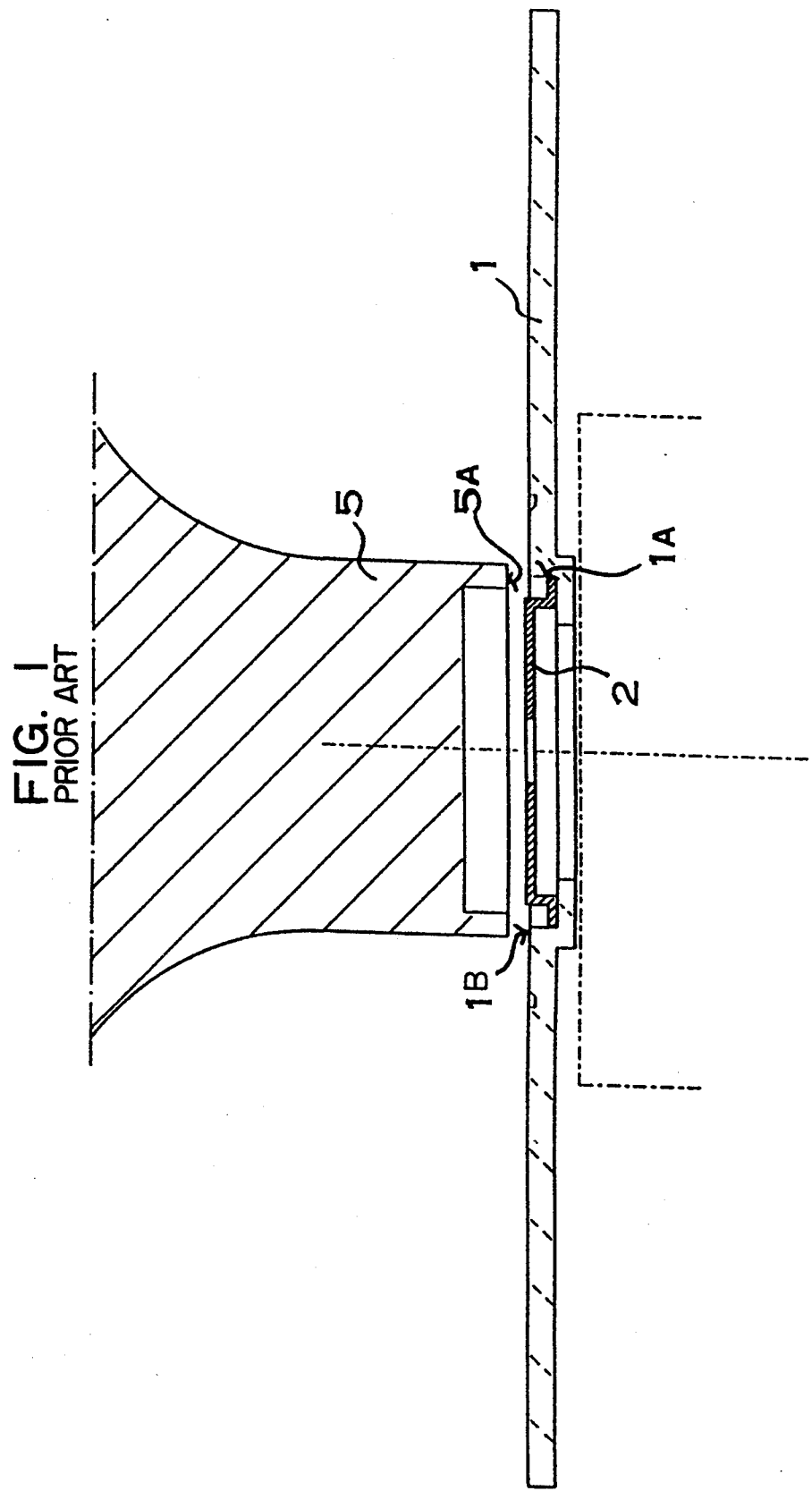
FIG. 1 is a cross-sectional view showing a prior art method of joining a clamping plate to a disk body.
Figure 2:
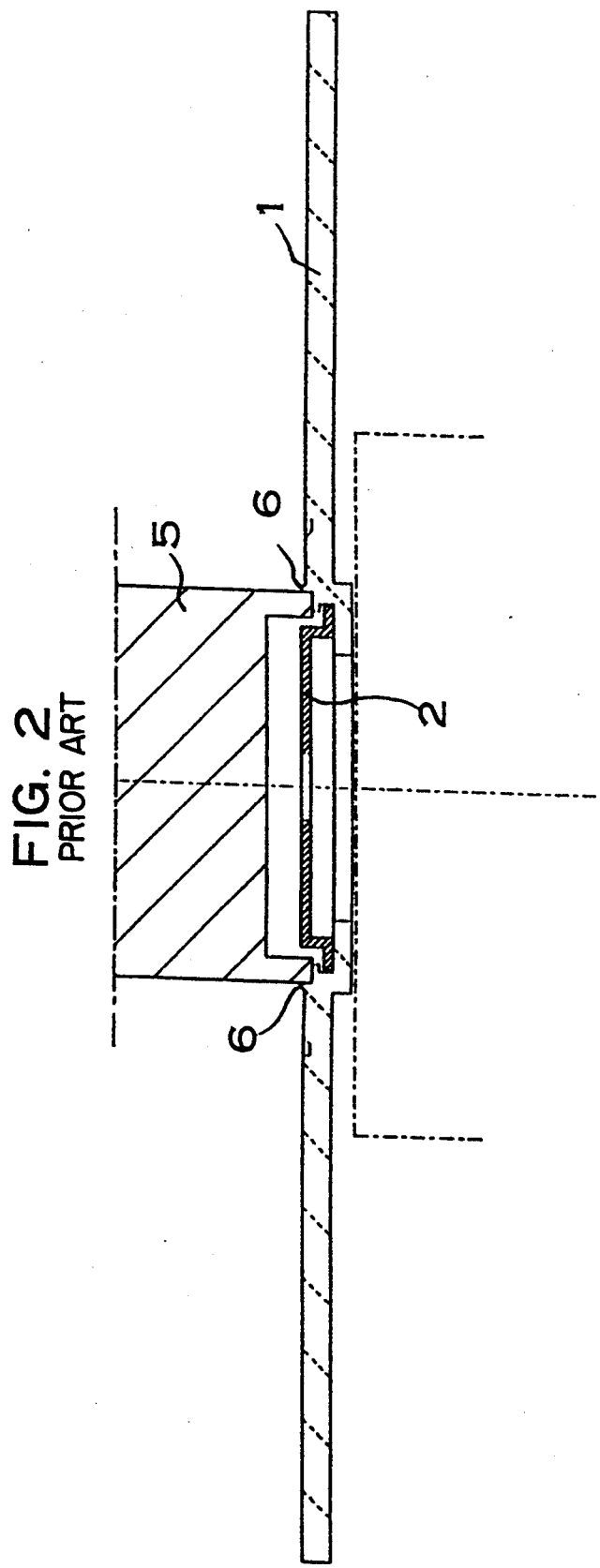
FIG. 2 is a cross-sectional view showing compression of the disk body shown in FIG. 1 by a heat press.
Figure 3:
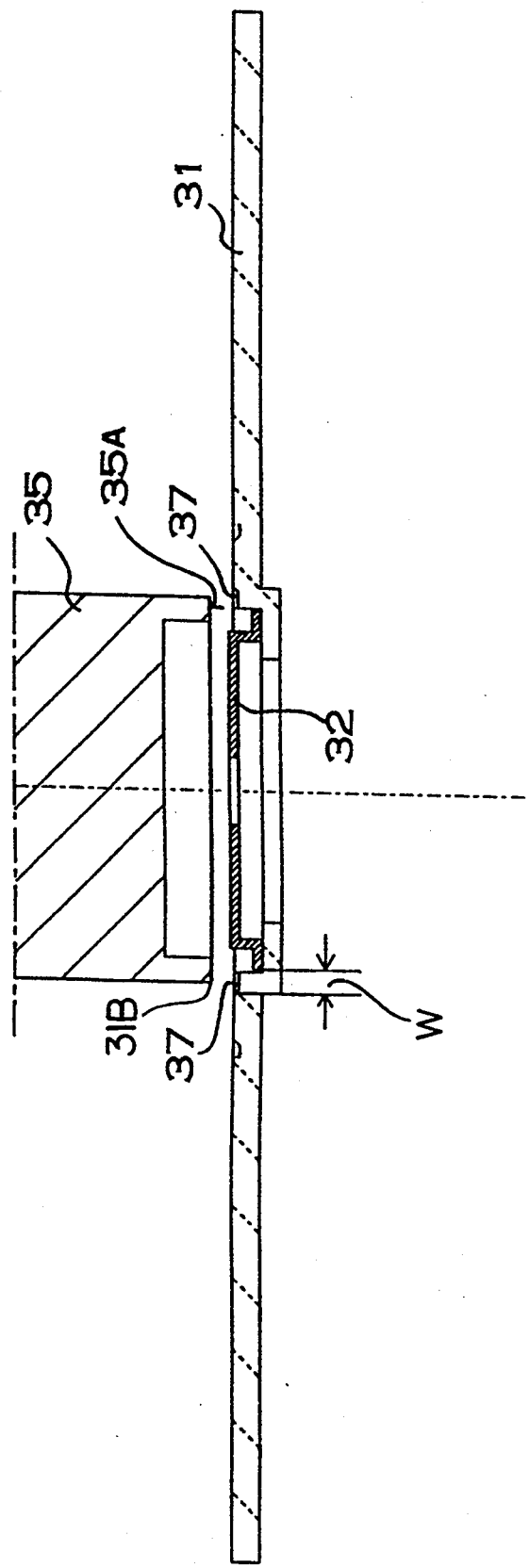
FIG. 3 is a cross-sectional view showing one embodiment of an optical disk manufacturing method of this invention.
Figure 4:
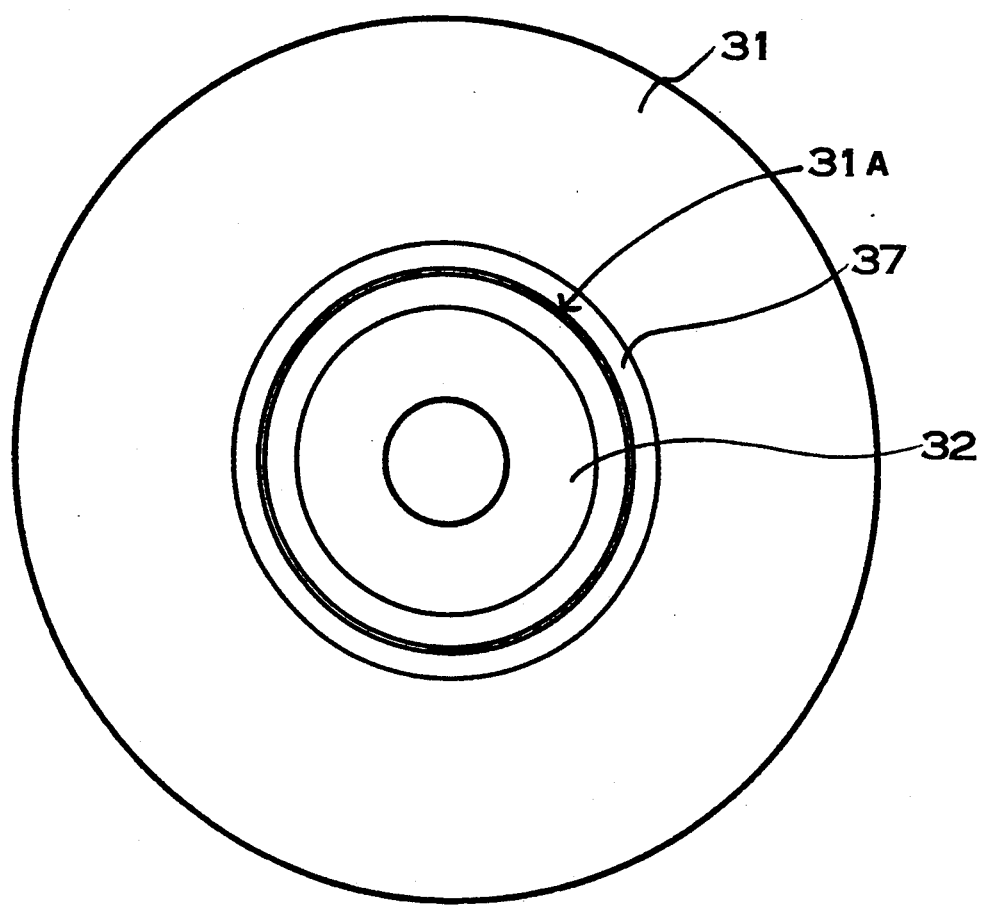
FIG. 4 is a plan view of a disk body shown in FIG. 3.
Figure 5:
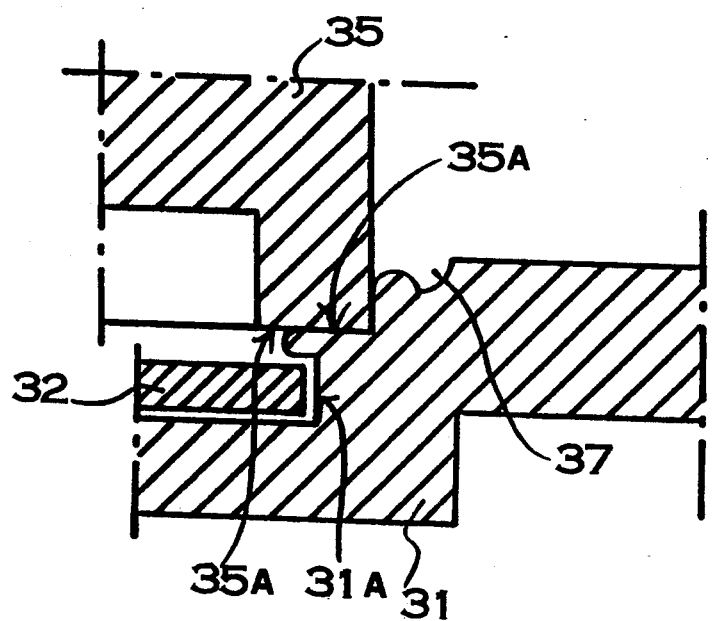
FIG. 5 is an enlarged cross-sectional view showing the disk of FIG. 3 compressed by a heat press.

As shown in the cross-sectional view of FIG. 3 and the plan view of FIG. 4, a ring shaped groove 37 is provided on a target surface 31B of a disk body 31 that is compressed by a pressure surface 35A of a heat press 35. It is desirable for the groove 37 to be designed with a width W such that its inner circumference coincides with the edge of the cavity 31A and its outer circumference is somewhat outside the pressure surface 35A of the heat press. In other words, the groove 37 is designed slightly wider than the target surface 31B to be compressed by the pressure surface 35A. The groove 37 is shallow and is effective to prevent protrusion out of the surface of the disk body 31. This is because, as shown in FIG. 5, for the groove 37 of width W, the protrusion from the pressure surface 35A during compression by the heat press is made within the groove 37.

Figure 6:
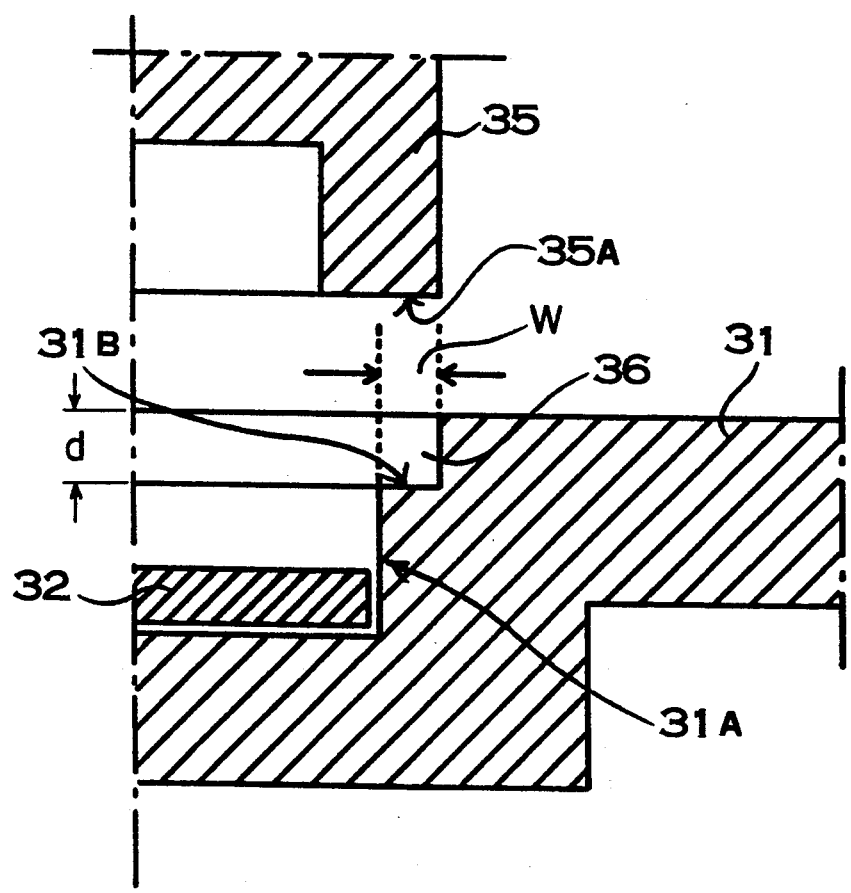
FIG. 6 is an enlarged cross-sectional view showing the disk body of another example of the optical disk manufacturing method of this invention.
Figure 7:
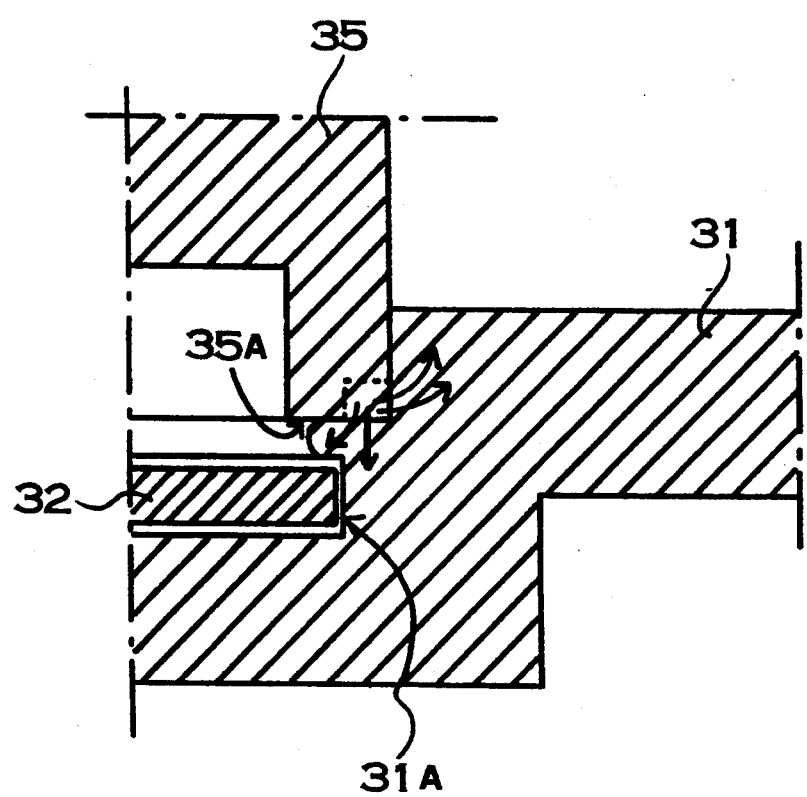
FIG. 7 is an enlarged cross-sectional view showing compression of the disk of FIG. 6.

As shown in FIG. 6, it is also possible to make the groove width W the same as the width of the target surface 31B: In other words, it is also possible to have the outer perimeter of the groove align with the outer perimeter of the pressure surface 35A. FIG. 7 shows this type of groove 36 compressed by the heat press 35. As shown in this figure, a protrusion around the perimeter of the target surface 31B can be prevented by making the groove 36 for this type of disk body 31 deep. When the heat press 35 compresses the target surface 31B, the plastic of the disk body 31 is stressed internally in the directions shown by the arrows of FIG. 7. Because of this internal stress, the heated plastic becomes flexible or molten and flows. At this point the vertical edge of the cavity 31A is not blocked, and plastic easily flows to and projects into the cavity 31A. On the other hand, since a thick layer of plastic exists outside the cavity 31A edge, plastic cannot flow in the outward direction and a protrusion outside the perimeter of the target surface 31B is prevented.

The optimum depth d of the groove 38 is designed based on the groove 36 width W and the compressing stroke of the heat press 35 into the disk body 31 (the distance the pressure surface 35A drops after contacting the surface of the disk body 31). When the groove 36 width W is made equal to the width of the target surface 31B, it is desirable to design the groove 36 depth d greater than the compressing stroke of the heat press 35. When the groove 36 width W is greater than (i.e. extends outwardly of) the width of the target surface 31B, optimum groove 36 depth d depends on how much wider the groove is than the target surface 31B. For example, when the groove width W is 50% greater than the width of the target surface 31B, the groove depth d is made at least 70% of the compressing stroke of the heat press 35.

Figure 8:
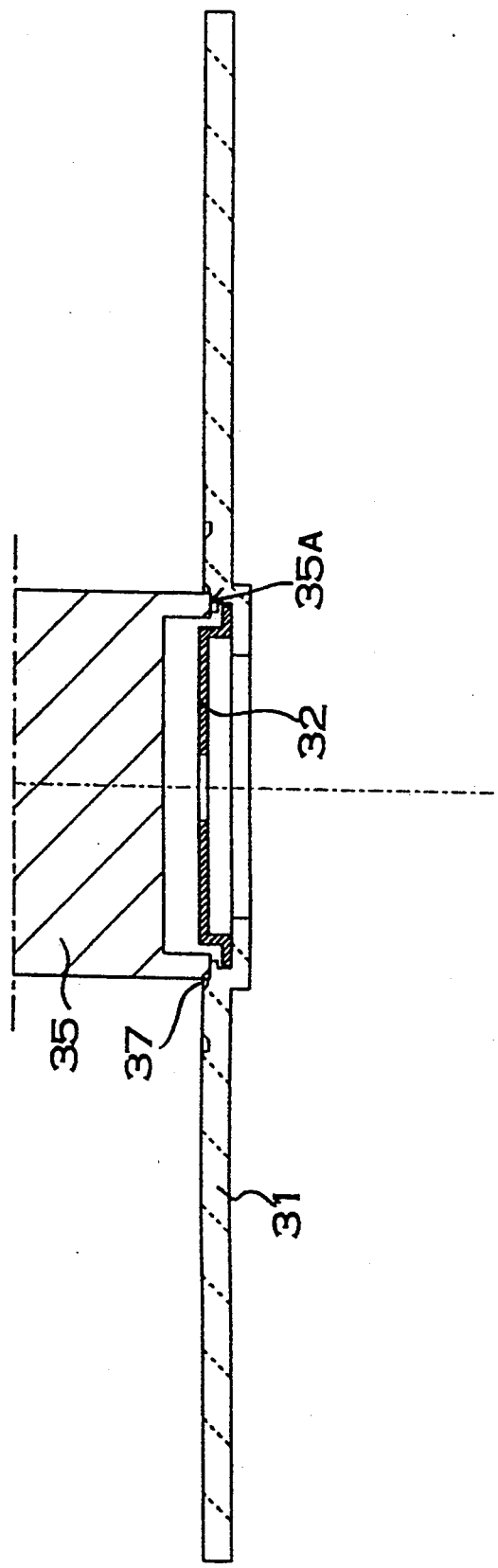
FIG. 8 is a cross-sectional view showing the disk of FIG. 3 compressed by the heat press.

A clamping plate is aligned in the cavity of the grooved disk body on top of a horizontal platform. As shown in FIG. 8, the heat press 35 is then dropped vertically such that the pressure surface 35A of the heat press 35 heats and compresses the disk body 31 at the target surface 31B. The compressed disk body 31 has plastic protruding from the inside edge of the cavity 31A joining the clamping plate 32 such that it will not pull out. The heat press subsequently is raised and the disk body 31 with clamping plate 32 joined is removed from the press platform.

Second Embodiment

Figure 9:
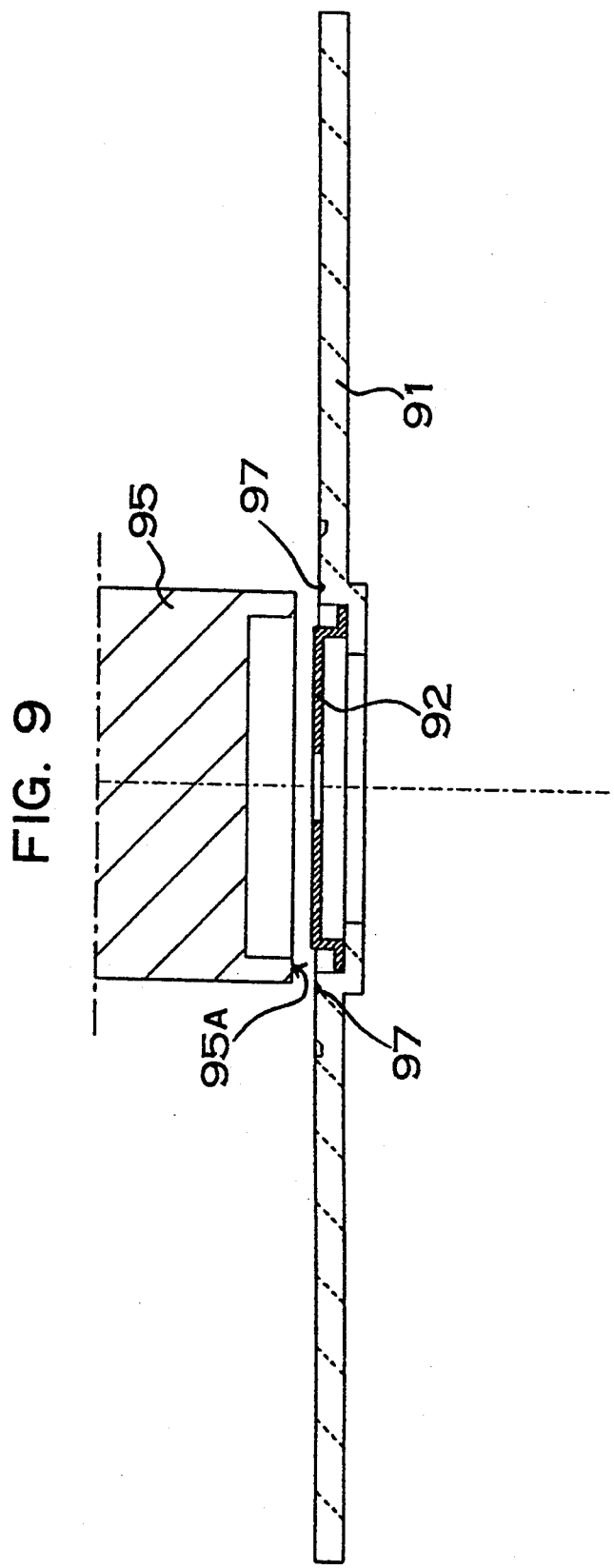
FIG. 9 is a cross-sectional view showing the disk body used in still another embodiment of the optical disk manufacturing method of this invention.
Figure 10:
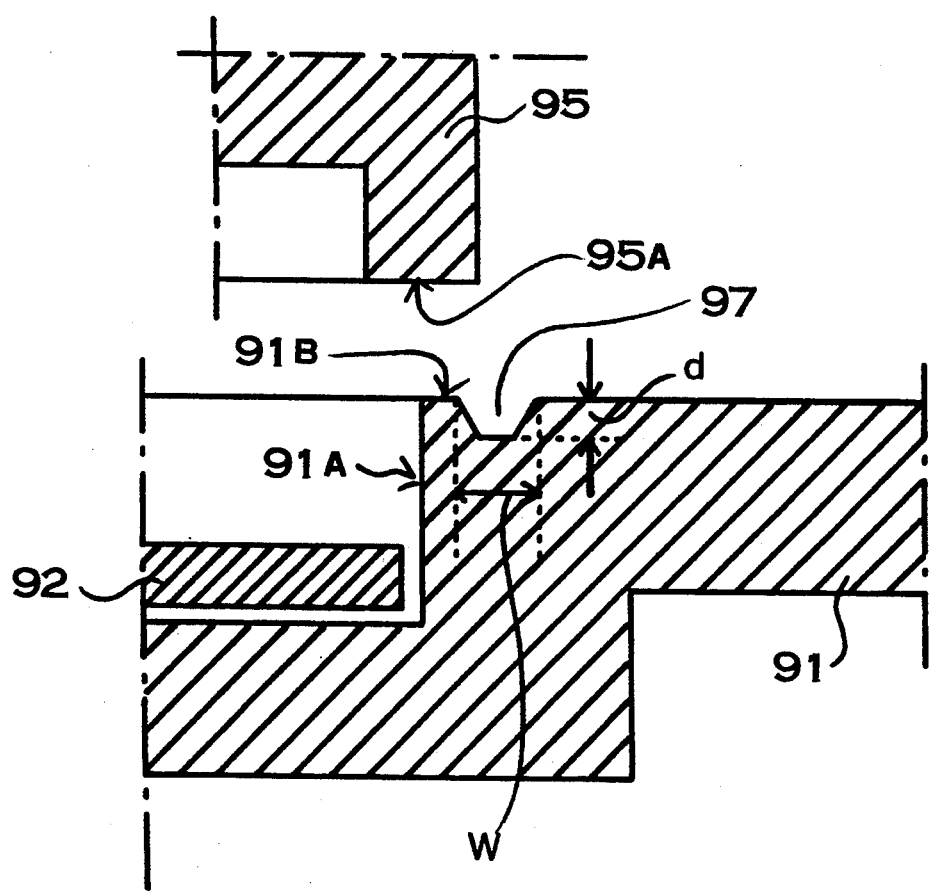
FIG. 10 is an enlarged cross-sectional view showing a pertinent part of the disk body of FIG. 9.
Figure 11:
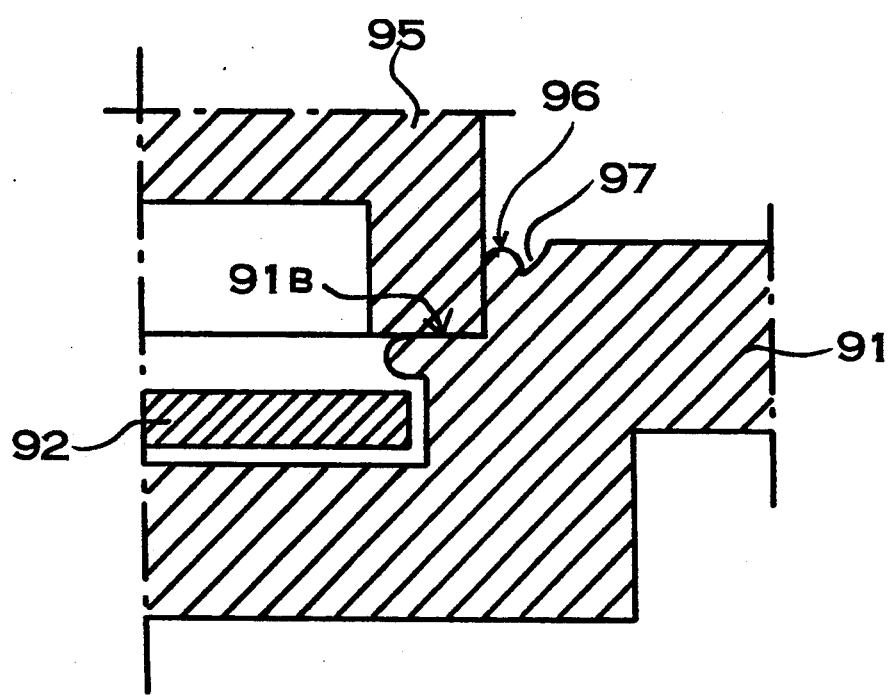
FIG. 11 is an enlarged cross-sectional view showing compression of the disk body of FIG. 9 by a heat press.

Turning to FIG. 9, a groove is provided not on the target surface, but rather in a ring shape along the outer perimeter of the target surface. As shown in the enlarged cross-sectional view of FIG. 10, the groove 97 is provided continuously along the outer perimeter of the target surface 91B. As shown in FIG. 11, the width W and depth d of the groove 97 are designed to absorb the protrusion 96 produced when target surface 91B is compressed by the heat press 95. Consequently, the groove 97 cross-sectional area is made larger than the protrusion 96 cross-sectional area, and preferably the groove width W is wider than the protrusion 96 width and the depth d is deeper than the protrusion 96 height. In the same manner as the first embodiment, a clamping plate 92 is aligned in the cavity of this type of disk, the disk is compressed by the heat press 95, and the clamping plate is joined to the disk body 91.

In this method of joining the clamping plate in the disk cavity with a groove provided on the target surface or around its perimeter, protrusion at the perimeter of the target surface is absorbed by the groove. In this method, the disk body is heated and compressed by a heat press or by a heat press with an upper pressure surface. Consequently, even when one region of the disk body is Compressed by the heat press to join the clamping plate to the disk, no protrusion above the disk surface occurs and the detrimental effects caused by a protrusion can be prevented.

Third Embodiment

Figure 12:
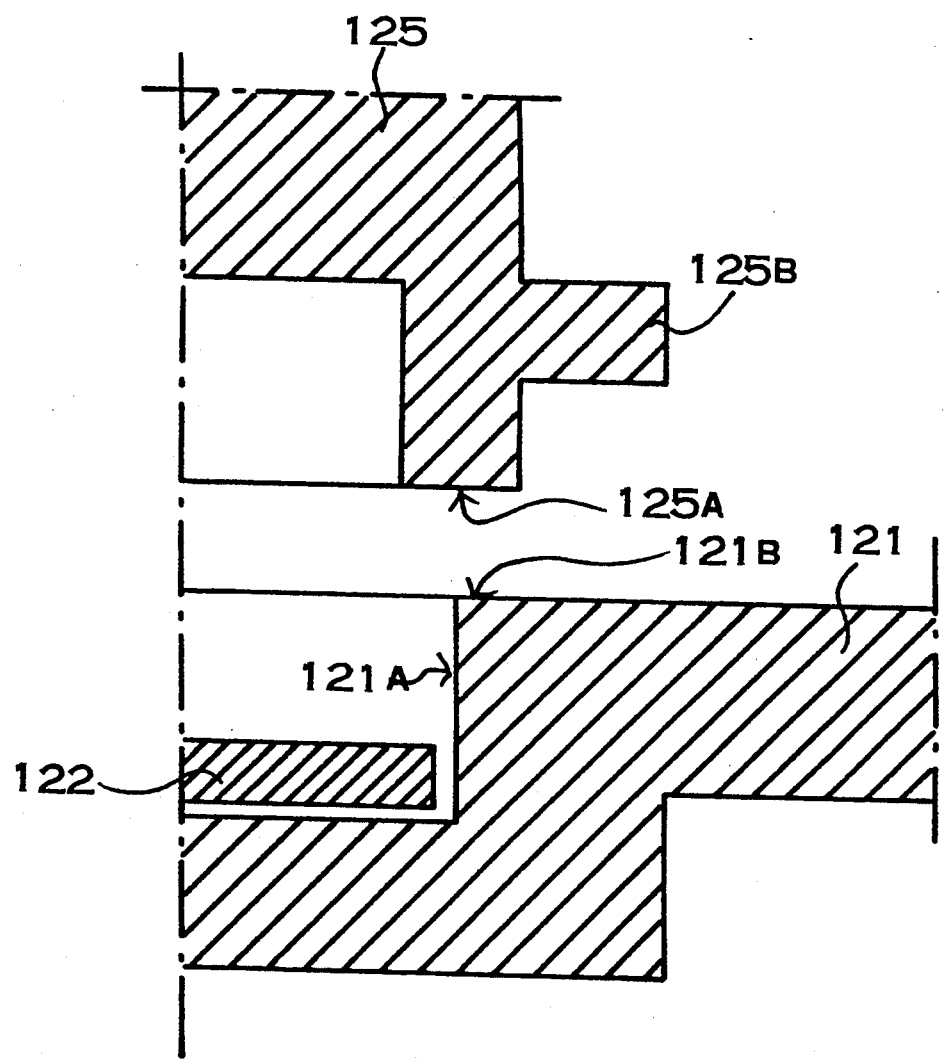
FIG. 12 is an enlarged cross-sectional view showing the pertinent part of a heat press used in still another embodiment of the optical disk manufacturing method of this invention.
Figure 13:
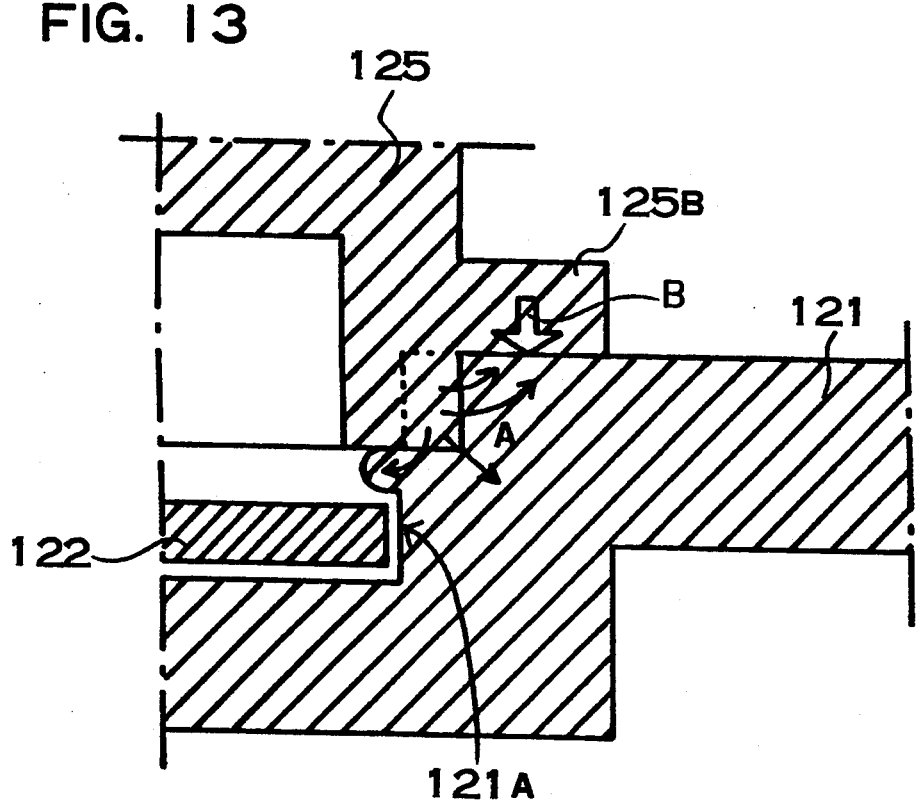
FIG. 13 is an enlarged cross-sectional view showing disk compression by a heat press of a disk shown in FIG. 12.

The disk body is placed on a horizontal press platform and the target surface is compressed by the heat press 125 shown in FIG. 12. The heat press 125 shown in this figure has an upper pressure surface 125B provided around the perimeter of the pressure surface 125A. The upper pressure surface 125B is a collar arrangement positioned slightly above the bottom of the heat press. As shown in FIG. 13, the upper pressure surface 125B presses on the upper surface of the disk body 121 to prevent formation of a protrusion when the pressure surface 125A compresses the target surface 121B of the disk. Consequently, the upper pressure surface 125B is positioned to come in contact with the upper surface of the disk body 121 with the heat press 125 compressed down on the target surface 121B of the disk body 121. In other words, the upper pressure surface 125B is positioned above the heat press bottom pressure surface 125A by a distance equal to the disk compressing stroke of the heat press 125. The bottom surface of the upper pressure surface 125B is planar so as to form a planar upper surface on the disk body 121.

When this configuration of the heat press 125 compresses the target surface 121B of a disk body 121 without a groove, internal stress in the plastic is produced as shown by the arrows A in FIG. 13. Here the force pushing upward on the surface of the disk body 121 is countered by the compressing force of the upper pressure surface 125B shown by arrow B preventing a protrusion from the surface. Consequently, this type of heat press 125 can prevent creation of a protrusion on a disk body 121 with no groove. Needless to say, this type of heat press 125 can also prevent creation of a protrusion on a disk body 121 with a groove.

Figure 14:
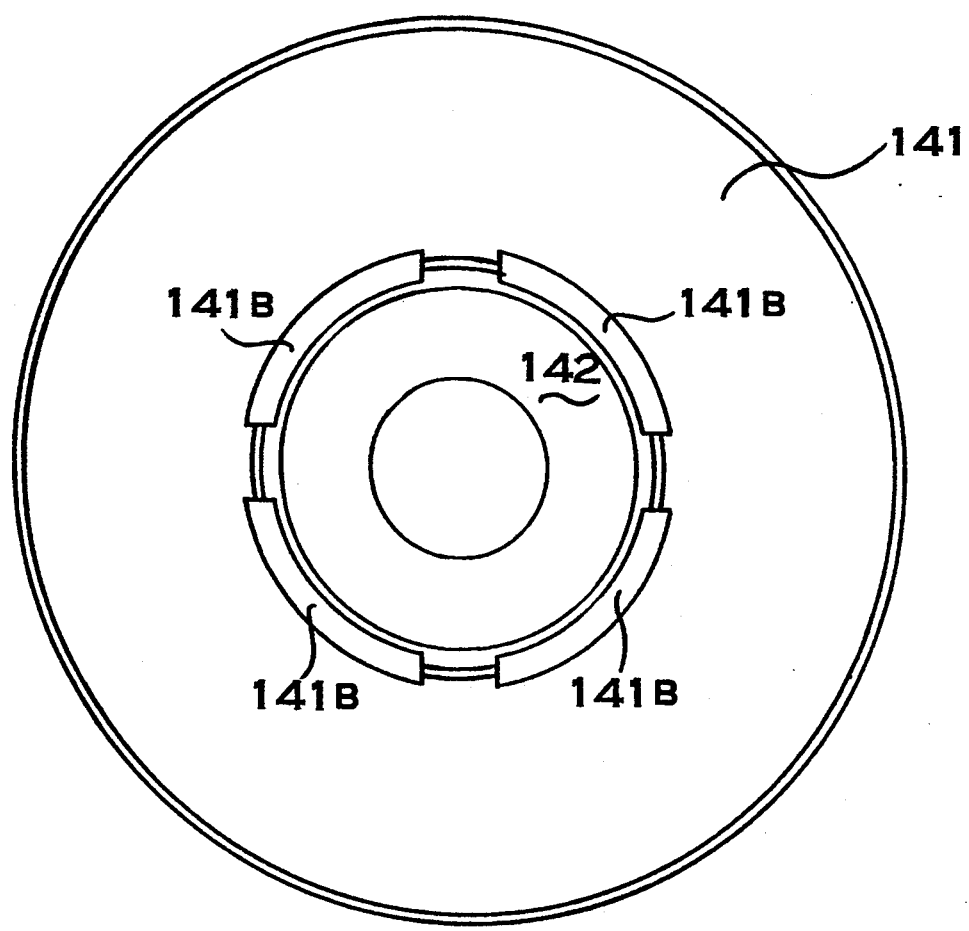
FIG. 14 is a plan view showing an example of disk compression a heat press.

Although the heat press can connect the clamping plate by compression in a continuous ring shape around the perimeter of the cavity, it can also connect the clamping plate by discontinuous compression as shown in FIG. 14. For the case shown in this figure where the clamping plate 142 is connected by discontinuous compression of the disk body 141, the groove provided in the disk body 141 as well as the upper pressure surface can also be discontinuous.

The optical disk can be manufactured by the preceding method using the following apparatus. The manufacturing equipment shown in FIG. 15 through FIG. 17 comprise a disk transporter 153 to transport the plastic disk body 151, a press platform 157 where the disk body 151 is placed after transport by the disk transporter 153, and a heat press 155 to connect the clamping plate 152 aligned to the center of the disk body 151 on the press platform 157 by heating and compressing the central region of the disk body 151.

Figure 15:
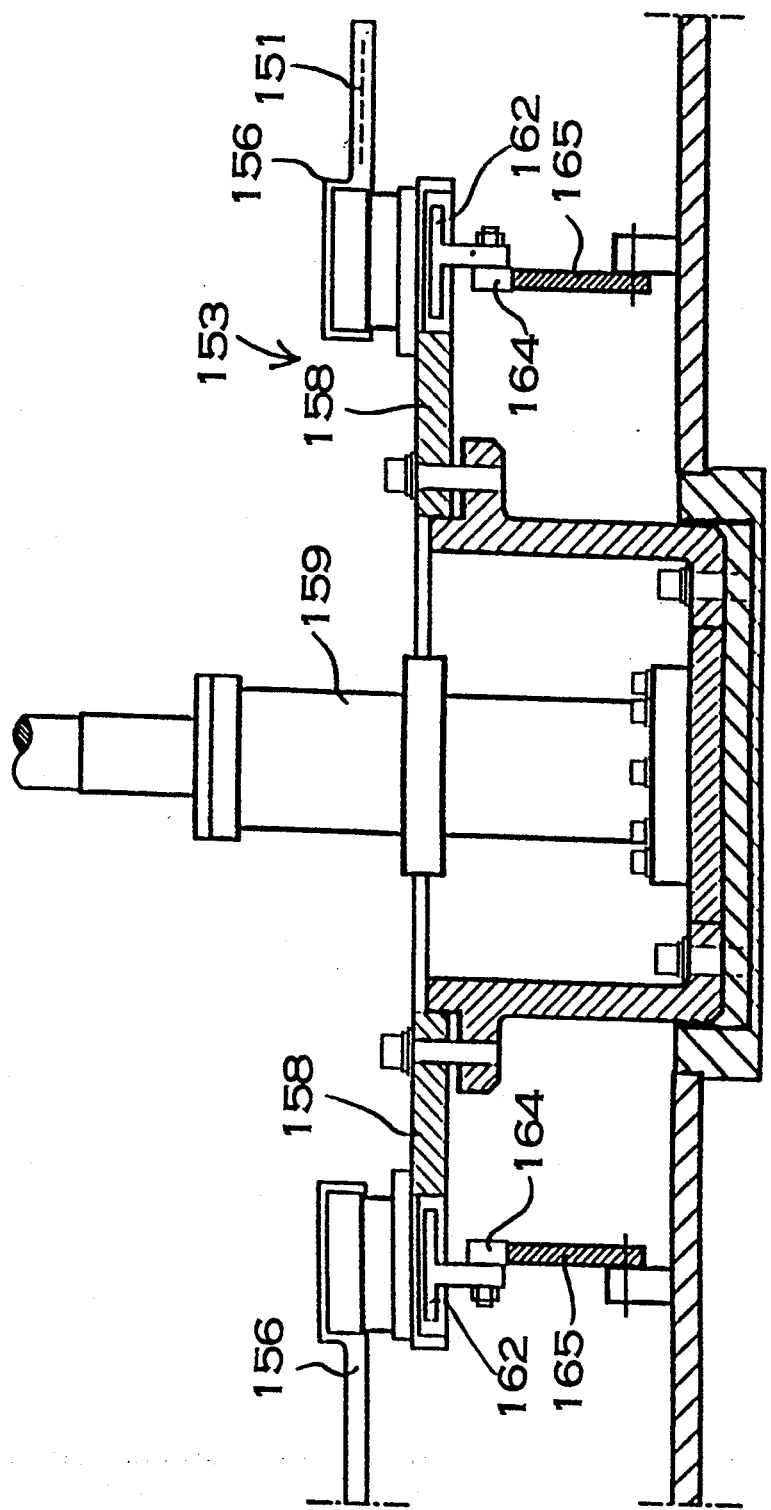
FIG. 15 is a vertical cross-sectional view showing a disk transporter for moving the disk body.
Figure 16:
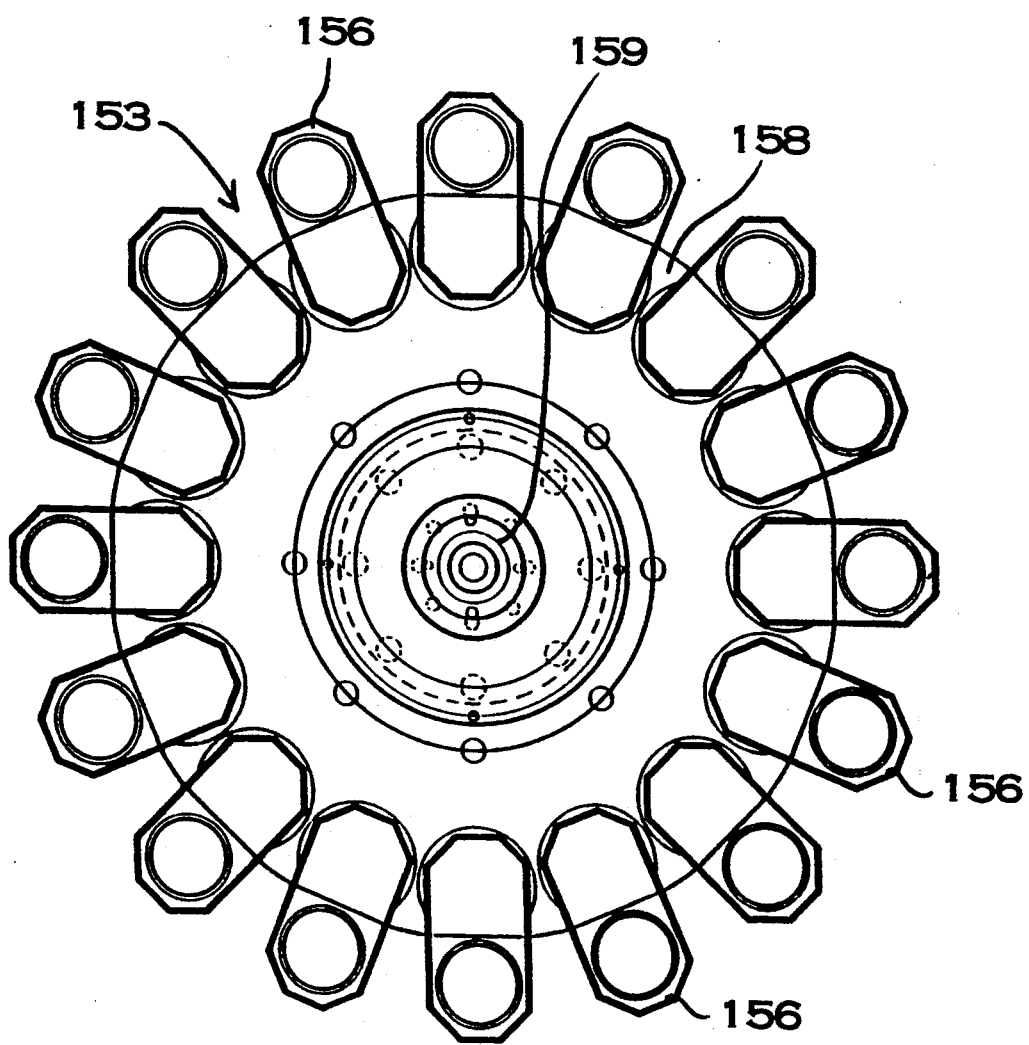
FIG. 16 is a plan view showing the disk transporter of FIG. 15.
Figure 17:
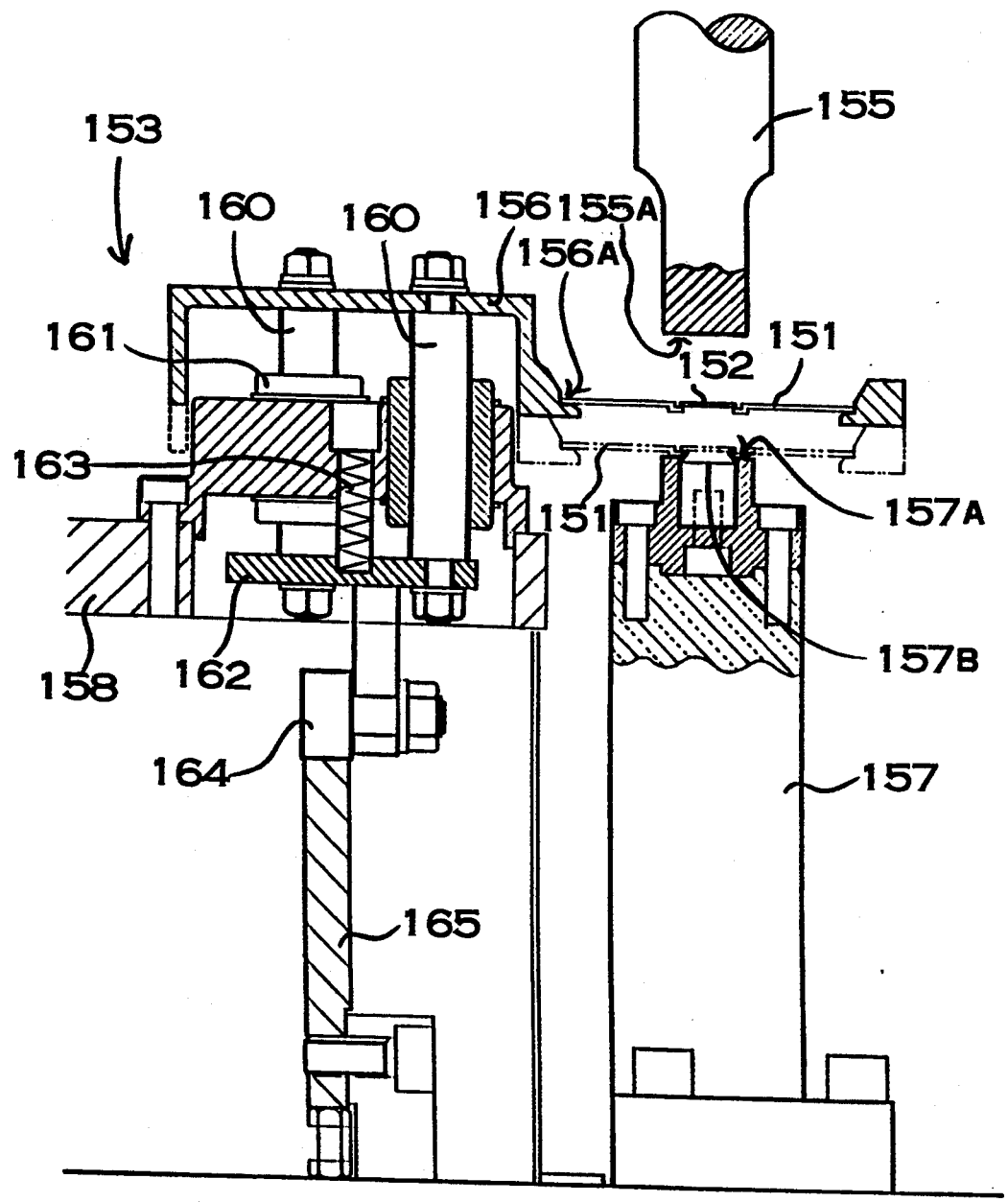
FIG. 17 is a vertical cross-sectional view showing a vertically removable platform of the disk transporter of FIG. 15.

The disk transporter 153 is provided with a vertically movable platform 156 for placing the disk body 151, a disk transporter frame 158 supporting the vertically movable platform 156 and connected thereto in a manner allowing its free vertical movement, and a vertical movement mechanism to move the platform 156 up and down and place the disk body 151 on the press platform 157. FIG. 15 is a vertical cross-section of the disk transporter 153, FIG. 16 is a plan view of the disk transporter 153, and FIG. 17 is a cross-section around the vertically movable platform 156. The disk transporter 153 shown in these figures has a circular disk transporter frame 158 with vertically movable platforms 156 attached to its perimeter at equal intervals in a manner allowing vertical movement. The disk transporter frame 158 shown in FIG. 16 has sixteen pairs of vertically movable platforms 156 attached at equal intervals. The circular disk transporter frame 158 has a rotation shaft 159 fixed at its center. The rotation shaft is mounted vertically through a bearing allowing rotation. Although not illustrated, a servomotor is connected to the rotation shaft. The servomotor rotates the rotation shaft at (360/16)° angles to move the vertically movable platforms 156 consecutively on top of the press platform 157.

FIG. 17 shows the vertically movable platforms 156 connected to the disk transporter frame 158. The vertically movable platform 156 shown in this figure is attached to the disk transporter frame 158 through guide rods 160 and direct action bearings 161 which allow vertical movement. The direct action bearings 161 are fixed vertically to the disk transporter frame 158. The guide rods 160, which are inserted through the direct action bearings 161 in a manner allowing free movement, are fixed vertically to the bottom left of the vertically movable platform 156. The vertically movable platform 156 is stabilized by the plurality of guide rods 160 to avoid independent rotation. Each guide rod 160 connects to the disk transporter frame 158 through one of the direct action bearings 161. The bottom ends of the guide rods 160 are fixed to a connecting plate 162.

The vertically movable platform 156 is moved up and down by the vertical movement mechanism. The vertical movement mechanism comprises a spring 163 to resiliently push down on the vertically movable platform 156, a wheel 164 connected to the vertically movable platform 156, and a cylindrical cam 165 to push upward on the wheel 164. The spring 163 is provided between the connecting plate 162 of the vertically movable platform 156 and the direct action bearing 161 fixture to push downward on the connecting plate 162. The wheel 164 projects out from and connects to the bottom of the connecting plate 162. The cylindrical cam 165 is disposed in the track of the wheel 164. As the disk transporter frame 158 rotates, the wheel 164 moves along the cylindrical cam 165. Therefore, the vertically movable platform 156 can be moved up and down corresponding to raised and non-raised portion of the cylindrical cam 165. The vertically movable platform 156 drops at the non-raised portions of the cylindrical cam 165, and rises at the raised portions. The vertically movable platform 156 places the disk body 151 on the press platform 157 when it is directly over the press platform 157. Therefore, the cylindrical cam 165 lowers the vertically movable platform 156 when it is precisely over the press platform 157 and raises it elsewhere. With the vertically movable platform 156 in its lowered state, the disk body 151 riding on the vertically movable platform 156 is transferred to the press platform 157

The right side of the vertically movable platform 156 as shown in FIG. 17 has a disk support to hold the outer edge of the disk body 151. The disk support comprises a support ledge 156A to hold the outer edge of the disk body 151. Above the support ledge 156A the circular opening is made slightly larger than the outer diameter of the disk body 151, and below the support ledge 156A the circular opening is made slightly smaller than the outer diameter of the disk body 151. In an vertically movable platform 156 of this structure, the outer edge of the disk body 151 rides on the circular ledge that is smaller than the disk during transport.

The press platform 157 is mounted on a base at the center of the location where the disk body 151 has been brought for connection of the clamping plate 152. The top of the press platform 157 has a cylindrical sleeve surface 157A to support the under surface of the central region of the disk body 151 that molds to the clamping plate 152. The cylindrical sleeve surface 157A is a planar surface wide enough to support the clamping plate connecting region of the disk body 151. A truncated conical guide 157B that is inserted into the center hole of the disk body 151 is provided at the center of the cylindrical sleeve surface 157A. The truncated conical guide 157B is inserted into the center hole of the disk body 151 to accurately align the disk body in the center of the press platform 157. Consequently, the truncated conical guide 157B is narrower at the top with an outside diameter approximately equal to the size of the center hole in the disk body 151. The truncated conical guide 157B is designed with a height such that it does not push up the clamping plate 152 aligned at the center of the disk body 151.

The heat press 155 ultrasonically vibrates the thermoplastic disk body 151 to connect the clamping plate 152. Consequently, an ultrasonic acoustic horn is used in the heat press 155. The pressure surface 155A on the bottom of the heat press 155 compresses and ultrasonically vibrates the target surface around the perimeter of the clamping plate 152 at the center of the disk body 151. The plastic of the compressed disk body 151 is heated and crushed to connect the clamping plate 152. However, it is also possible to join the clamping plate 152 by disk compression with a heat press 155 using heating by a heater rather than ultrasonic vibration. The heat press 155 drops toward the disk body 151 aligned on the press platform 157 to join the clamping plate 152 to the disk body 151. Consequently, although not illustrated, the heat press is connected to the base through a mechanism providing vertical movement.

The optical disk manufacturing apparatus with this structure connects a clamping plate 152 to a disk body 151 by the following process steps.

① A disk body 151 is set into the support ledge 156A of the vertically movable platform 156, and a clamping plate 152 is placed in the center of the disk body 151. Rotation of the disk transporter frame 158 is stopped at this point.

② The disk transporter frame 158 rotates to move the disk body 151 directly over the press platform 157, then stops.

③ When the disk body 151 is transported directly over the press platform 157, the wheel 164 travels along the cylindrical cam 165 and the vertically movable platform 156 is lowered by the cylindrical cam 165. When the vertically movable platform 156 drops, the disk body 151 on the vertically movable platform 156 is transferred to the press platform 157.

④ The heat press 155 drops to heat and compress the central region of the disk body 151 deforming the plastic of the disk body 151 and connecting the clamping plate 152 at the disk center. Rotation of the disk transporter frame 158 is stopped at this point.

(5) The heat press 155 is subsequently raised. Rotation of the disk transporter frame 158 is stopped at this point also.

(6) The disk transporter frame 158 is rotated (360/16)°. When the disk transporter frame 158 rotates, the vertically movable platform 156 is raised due to the cylindrical cam 165, and the disk body 151 on the cylindrical sleeve surface 157A is taken off the top of the press platform 157. At this point, a disk body 151 set on the next vertically movable platform 156 is delivered directly above the press platform 157.

After this, process steps (4) through (6) are repeated connecting the clamping plate 152 to the disk body 151. Here, disks with clamping plates 152 connected are removed from the vertically movable platform 156, and disks without clamping plates 152 connected are supplied to it.

In the optical disk manufacturing method where the disk is compressed by a heat press with an upper pressure surface, the upper surface of the disk where a protrusion can be formed is pressed by the upper pressure surface while one region of disk plastic is compressed to connect the clamping plate. Therefore, the plastic compressed in one region does not protrude out the upper surface of the disk body, and creation of a protrusion during disk compression can be effectively prevented. This method has the feature that no specially formed disk body shape is required and a prior art disk body can be used while protrusions are prevented.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof.

We claim:

1. An optical disk manufacturing method wherein:
   (a) a groove is provided in a target surface of a plastic disk body which is to be compressed by a pressure surface of a heat press;
   (b) a clamping plate is positioned in a cavity at a center of the plastic disk body; and
   (c) the disk body is heated and compressed around a perimeter of the clamping plate by the heat press to distort the plastic of the disk body to cause it to protrude in a radially inward direction towards a center of the clamping plate, to thereby connect the clamping plate to the disk body.

2. An optical disk manufacturing method as recited in claim 1, wherein
   the groove is ring shaped.

3. An optical disk manufacturing method as recited in claim 1, wherein
   the groove is provided around the entire outer perimeter of the cavity.

4. An optical disk manufacturing method as recited in claim 1, wherein
   the groove has an inside edge thereof coincident with an edge of the cavity and an outside edge thereof outside the pressure surface of the heat press.

5. An optical disk manufacturing method as recited in claim 1, wherein
   a width of the groove is the same as a width of the target surface.

6. An optical disk manufacturing method as recited in claim 1, wherein
   a width of the groove is the same as a width of the target surface and a depth of the groove is larger than a compressing stroke of the heat press.

7. An optical disk manufacturing method wherein:
   (a) a groove is provided at an outer perimeter of a target surface of a plastic disk body which is to be compressed by a pressure surface of a heat press;
   (b) a clamping plate is positioned in a cavity at a center of the plastic disk body; and
   (c) the disk body is heated and compressed around a perimeter of the clamping plate by the heat press to distort the plastic of the disk body to cause it to protrude in a radially inward direction towards a center of the clamping plate, to thereby connect the clamping plate to the disk body.

8. An optical disk manufacturing method as recited in claim 7, wherein
   the groove is ring shaped.

9. An optical disk manufacturing method as recited in claim 7, wherein
   a cross-sectional area of the groove is greater than a cross-sectional area of a protrusion made when the target surface is compressed by the heat press.

10. An optical disk manufacturing method wherein:
    (a) a clamping plate is positioned in a cavity at a center of a plastic disk body; and
    (b) a target surface around the cavity of the disk body is compressed by a lower pressure surface of a heat press, and an upper pressure surface concurrently presses outside the target surface, to cause the plastic of the disk body to protrude in a radially inward direction towards a center of the clamping plate, to thereby connect the clamping plate to the disk body.

11. An optical disk manufacturing method as recited in claim 10, wherein
    the upper pressure surface comprises a collar portion of said heat press and is spaced above the lower pressure surface of the heat press.

12. An optical disk manufacturing method as recited in claim 11, wherein
    the upper pressure surface is positioned a distance above the lower pressure surface equal to a stroke of the heat press in compressing the disk body.

13. An optical disk manufacturing method as recited in claim 10, wherein
    the upper pressure surface is planar.

14. An optical disk manufacturing method as recited in claim 10, wherein
    no groove is formed in the disk body outside of the target surface prior to compression of the target surface of the disk body by the heat press.

15. An optical disk manufacturing method as recited in claim 10, wherein
    a groove is formed in the disk body outside of the target surface.

* * * * *